United States Patent [19]

Wietsma et al.

[11] Patent Number: 5,166,269
[45] Date of Patent: Nov. 24, 1992

[54] HEAT SEALABLE PVC BLENDS

[75] Inventors: Popke Wietsma, Velp; Joy Stam, Zevenaar, both of Netherlands

[73] Assignee: BASF Corporation, Parsippany, N.J.

[21] Appl. No.: 397,204

[22] Filed: Aug. 23, 1989

[51] Int. Cl.$^5$ .................. C08L 27/04; C08L 33/02; C08L 33/04; C08L 33/24
[52] U.S. Cl. .................. 525/214; 428/224; 428/304.4; 525/217; 525/218; 525/221
[58] Field of Search .............. 525/221, 214, 217

[56] References Cited

U.S. PATENT DOCUMENTS 3,063,961  11/1962  Frank ..................... 525/221
4,623,698  11/1986  Jacob et al. ............... 525/221

*Primary Examiner*—Jacob Ziegler
*Attorney, Agent, or Firm*—Michael R. Chipaloski

[57] ABSTRACT

Blends of styrene-butadiene rubber and PVC latices in a dry weight ratio of 45:10 to 55:70 are useful to form heat sealable films. The mixture does not contain plasticizers and thus reduces environmental concerns during processing. The resulting film have good clarity and flexibility and may be used to seal textiles, non-wovens and boards.

8 Claims, No Drawings

HEAT SEALABLE PVC BLENDS

FIELD OF THE INVENTION

The present invention relates to aqueous based compounds useful in heat sealable and/or high frequency (dielectric) applications. More particularly the present invention relates to compounds which have a low flamability, reduced plasticizer level, and give a product with a good hand or resilience. More particularly the present invention relates to compositions to coat or impregnate substrates such as non-wovens, textiles, boards and synthetic boards, and open-celled foams such as polyurethane foams.

BACKGROUND OF THE INVENTION

It is known to coat non-woven webs with various aqueous based coatings. In many instances it is desired to form a smooth continuous coating such as veneers for simulated wood panelling. Such surfaces must be relatively clear, adhere well to the substrate and be washable. In other applications the product must be soft and flexible such as in coating or impregnating non-woven webs and textiles. Impregnants for foams are also required to be soft and flexible. In all these applications heat sealability can be a requirement.

Polyvinyl chloride is used in some of these applications. Unfortunately, PVC homopolymers are not film forming at low temperatures and tend to be too hard to be useful in these applications. Copolymers of vinyl chloride and "soft" monomers have a reduced hardness but often it is not sufficient for the required application and there may be a sacrifice of other properties. To overcome these problems external plasticizers may be added to the vinyl polymer. This creates a problem for the converter as plasticizer may be lost to the environment during hot operations such as calendering and/or drying. This loss to the atmosphere is becoming more environmentally unacceptable. In some products the plasticizer may migrate to the upper surface resulting in a dirty, greasy appearance, which may be accompanied by "bloom" of chemicals within the PVC coating.

One approach to soften PVC is to blend it with other polymers such as butadiene-acrylonitrile copolymers, acrylate and methacrylate copolymers. Conventional wisdom is that PVC type polymers are incompatible with styrene-butadiene polymers.

The present invention seeks to overcome the above drawbacks by providing a blend of PVC and carboxylated styrene-butadiene type latices, which, surprisingly in view of the incompatibility of the polymers, exhibit extremely useful properties.

SUMMARY OF THE INVENTION

The present invention provides a heterogeneous, heat sealable composition comprising:

A) from 10 to 70 parts by dry weight of a latex of a vinyl polymer comprising:
  i) 100 to 75 weight percent of vinyl and
  ii) up to 25 weight percent of a $C_{2-8}$ alkyl acrylate;

B) from 20 to 70 parts by dry weight of a carboxylated styrene-butadiene polymer comprising:
  i) 40 to 60 weight percent of a $C_{8-12}$ vinyl aromatic monomer which is unsubstituted or substituted by a $C_{1-4}$ alkyl radical or a chlorine atom;
  ii) from 39.5 to 59.5 weight percent of a $C_{4-6}$ straight or branched chain conjugated diolefin which is unsubstituted or substituted by a chlorine atom;
  iii) from 0.5 to 10 weight percent of a $C_{3-6}$ ethylenically unsaturated carboxylic acid, and
  iv) from 0 to 5 weight percent of one or more monomers selected from the group consisting of:
    a) $C_{1-8}$ alkyl and hydroxyalkyl esters of $C_{3-6}$ ethylenically unsaturated carboxylic acids;
    b) amides of $C_{3-6}$ ethylenically unsaturated carboxylic acids, which amides are unsubstituted or substituted at the nitrogen atom by up to two radicals selected from the group consisting of $C_{1-4}$ alkyl and hydroxyalkyl radicals; and
    c) $C_{3-6}$ ethylenically unsaturated aldehydes; and C) optionally up to about 5 parts by weight per 100 parts by dry weight of polymer of a reinforcing resin.

DETAILED DESCRIPTION

The compositions of the present invention are suitable as coatings on substrates such as board and board substitutes, non-wovens, and textiles, and as an impregnant for non-wovens and open-celled foams.

The polymers useful in accordance with the present invention may be characterized as vinyl polymers and carboxylated styrene-butadiene polymers. The compositions of the present invention may optionally comprise up to 5 parts per 100 parts of polymer of a reinforcing resin and up to about 300 parts per 100 parts of polymer by weight of one or more members selected from the group consisting of fillers, flame retardants, and antioxidants. The vinyl polymer may be present in an amount from 10 to 70, preferably 20 to 50, most desirably from 30 to 40, most preferably about 35 parts by weight. The carboxylated styrene-buta-diene polymer may be present in an amount from about 20 to 70 preferably 30 to 70, most preferably about 50 to 65 parts by weight.

Suitable vinyl polymers comprise: from 100 to 75, preferably 75 to 80 weight percent of vinyl and up to 25, preferably 20 to 25 weight percent of one or more $C_{2-8}$ alkyl acrylates, preferably ethyl, butyl, or ethylhexyl acrylate. The vinyl polymers should have a Tg in the range from about 55 to 80, preferably 60° to 70° C.

Suitable carboxylated styrene-butadiene polymers comprise: from 40 to 60 preferably 45 to 55, most preferably about 50 to 55 weight percent of one or more $C_{8-12}$ vinyl aromatic monomers which are unsubstituted or substituted by a $C_{2-4}$ alkyl radical or a chlorine atom; from 39.5 to 59.5 preferably from 44.5 to 54.5, most preferably from 45 to 50 weight percent of one or more $C_{4-6}$ conjugated diolefins which are unsubstituted or substituted by a chlorine atom; from 0.5 to 10 preferably less than 5 weight percent of a $C_{3-6}$ ethylenically unsaturated carboxylic acid; and optionally up to 5 weight percent of one or more functional monomers selected from the group consisting of $C_{1-8}$ alkyl and hydroxy alkyl esters of $C_{3-6}$ ethylenically unsaturated carboxylic acids; amides of $C_{3-6}$ ethylenically unsaturated carboxylic acids, which amides may be unsubstituted or substituted at the nitrogen atom by up to two radicals selected from the group consisting of $C_{1-4}$ alkyl and hydroxyalkyl radicals; and $C_{3-6}$ ethylenically unsaturated aldehydes.

Suitable vinyl aromatic monomers include styrene, and alpha-methylstyrene. Suitable conjugated diolefins include butadiene, isoprene and chloroprene. Suitable ethylenically unsaturated carboxylic acids include acrylic acid, methacrylic acid, and itaconic acid. Suitable functional monomers in the carboxylated styrene-butadiene polymer include ethyl acrylate, propyl acrylate, butyl acrylate, ethylhexyl acrylate, and N-methylol acrylamide.

The carboxylated styrene-butadiene polymer should be relatively soft and have a Tg in the range of $-5°$ to $-20°$ C., preferably about $-8°$ to $-15°$ C.

The compositions of the present invention may optionally comprise up to 5 parts by weight of a reinforcing resin. Suitable reinforcing resins include melamine resins. If this type of resin is used it may be present in an amount from 2 to 5 parts by weight.

The compounds of the present invention may be used to coat various substrates such as textiles, non-woven substrates or solid substrates such as veneered woods or simulated wood. The non-woven may be made from natural or synthetic fibers or a mixture thereof including cotton, rayon, silk, polyamides (nylon, and nylon 66) and polyesters. The non-woven may have a weight of at least about 10 g/m$^2$.

In open-celled foams, the foam may be impregnated with the compound at a pick of up to 150, preferably less than 50, weight percent.

The treated substrate is then dried usually in an oven, either a hot air oven or a high frequency oven, for example, at temperatures from 100° to 240° C., most preferably 180° to 200° C. The drying conditions will be dependent upon both the substrate (e.g. fiber, textile, or board) used and the type of oven (e.g. hot air, high frequency, microwave, etc.). Appropriate drying conditions may be determined by routine experiment. The latex dries to a clear tough resilient film.

The compounds of the present invention may also contain flame retardants and antioxidants as required for the specific use of the product. Care should be taken to test the compatibility of such additives to the compound to see that they do not cause the latex to prematurely set. If used, fillers, antioxidants, and flame retardants may be used in an amount up to 300 parts by weight per 100 parts of polymer. Inorganic flame retardants are usually used in larger amounts from 200–300 parts by weight per 100 parts of polymer. The organic halogenated flame retardants may be used in smaller amounts up to 20, preferably 5 to 10 parts by weight per 100 parts by weight of polymer.

The following examples are intended to illustrate the invention and not to limit it. In the examples, unless otherwise specified, parts are parts by dry weight.

EXAMPLE 1

A series of latex compounds containing a flame retardant were prepared. The compounds were then cast on a polythene foil at 500 microns wet thickness. The films on the polythene foil were dried overnight at 26° C. and cured for 5 minutes at 150° C. The tensile strength and other properties of the film were then measured.

The base latices used in the compounding contained the following polymers:

A) unplasticized vinyl chloride homopolymer,
B) a copolymer of vinyl chloride: ethyl acrylate unplasticized (80:20),
C) a carboxylated styrene-butadiene latex with a bound styrene content of 58%. The polymer had a Tg of $-8°$ C.
D) a carboxylated styrene-butadiene latex with a bound styrene content of about 53%. The polymer had a Tg of about $-8°$ C.
E) polybutadiene The results of the test are shown in Table 1. The results show: reasonable modulus, elongation, and surface properties are obtained with polymer blends of PVC and carboxylated styrene-butadiene rubber in accordance with the present invention. The compounds of the present invention provide heat sealable films with reasonable properties.

TABLE 1

| Latex | Weight Ratio | Flame Retardant | Modulus N/cm$^2$ Elongation 100% | 200% | Break | Elongation at Break % | Flamibility | Hand | Blue | Opacity |
|---|---|---|---|---|---|---|---|---|---|---|
| i) A | 100 | — | 720 | 1440 | 1845 | 250 | no ignition | no tack | 70 | 9 |
| ii) B | 100 | — | | | | Not film forming at 26° C. | | | | |
| iii) B:C | 20:80 | 10 | 360 | 590 | 985 | 325 | burns | tack | 70 | 30 |
| iv) B:C | 35:55 | 10 | 1023 | 1195 | 1261 | 220 | extinguishing | no tack | 78 | 36 |
| v) B:D | 22.5:77.5 | 5 | 631 | 992 | 1315 | 300 | burns | some tack | 79 | 23 |
| vi) B:D | 36.6:63.4 | 5 | 1080 | 1540 | 1540 | 200 | extinguishing | no tack | 79 | 25 |
| vii) B:E* | | | | | films brittle and greasy | | | | | |

Note:
*The polymers in the latex are not film forming at room temperature and are formed at elevated temperatures above 100° C. When cooled to room temperature the film becomes brittle.

EXAMPLE 2

The various compounds prepared in Example 1 were coated on aluminum at 500 microns wet thickness. The compounds were dried and heat sealed using a Barker Coleman sealability tester, model 105. The dried latex films were sealed one to another at various temperatures and the force to delaminate the film from each other was recorded. The results are plotted in FIG. 1.

The compounds used were:
Latex A,
Latex B and Latex C, and
Latex B and Latex D.

The results show reasonable heat sealability at temperatures in the 180° to 200° C. range.

EXAMPLE 3

An open-celled polyurethane foam was to be upgraded to be a high frequency (di-electric) sealable material.

A slab of polyurethane foam was impregnated with various latex compounds. The foam was dried 10 minutes at 90° C. then heat sealed. The foam pickup was 100%. The foams were all high frequency sealable. There were, however, differences in the physical properties of the impregnated foam. The compounds were unfilled and had their viscosity adjusted to about 1000 cps with an acrylate thickener. The compound had a solids level from 53 to 55 weight percent.

The polymer compositions in the compounds were as follows:
i) PVC homopolymer plasticized with 35 parts of dioctylphthalate per 100 parts of polymer
ii) a vinyl chloride: ethylacrylate copolymer (80:20)
iii) a carboxylated styrene-butadiene polymer with about 2% carboxylation and a bound styrene content of 46 weight percent. The compounds were as follows:

A (control) (i):(ii) in a 75:25 weight ratio
B (i)
C (iii)
D (ii):(iii) in a 20:80 weight ratio (outside the invention)
E (ii):(iii) in a 40:60 weight ratio (within the invention)
F (ii):(iii) in a 60:40 weight ratio (within the invention) The treated urethane foam was tested for tack (1=no tack, 3=tacky); hand (1=soft, 7=hard); resilience (1=acceptable, 2=moderate, 3=slower than 2) and cold flex at −23° C.

The results are set forth in Table II.

TABLE II

| Compound | A | B | C | D | E | F |
|---|---|---|---|---|---|---|
| Tack | 1 | 3 | 3 | 3 | 2 | 1 |
| Hand | 7 | 7 | 2 | 2 | 3 | 5 |
| Resilience | 3 | 3 | 3 | 3 | 3 | 2 |
| Cold Flex −23° C. | bad* | bad* | bad* | ok | ok | ok |

Note:
bad* means the film breaks on bending.

EXAMPLE 4

A series of compounds were prepared using base latex B and C as described in Example 1 with 10 parts of a flame retardant. The films were cast on an aluminum sheet and dried and described in Example 2. The films were then evaluated as in Example 1. The results are set forth in Table III.

TABLE III

| Latex | | Modulus at Break N/cm² | Elongation at Break % | Blue | Opacity |
|---|---|---|---|---|---|
| B | C | | | | |
| parts by weight | | | | | |
| 50 | 50 | 1450 | 145 | 77 | 39 |
| 60 | 40 | 1440 | 50 | 78 | 39 |
| 70 | 30 | 1440 | 6 | 79 | 39 |

What is claimed is:
1. A heterogeneous, heat sealable composition comprising:
A) from 10 to 70 parts by dry weight of a latex of a vinyl polymer comprising:
 i) 100 to 75 weight percent of vinyl or vinylidene chloride; and
 ii) up to 25 weight percent of a $C_{2-8}$ alkyl acrylate;
B) from 20 to 70 parts by dry weight of a carboxylated vinyl aromatic monomer-conjugated diolefin polymer comprising:
 i) 40 to 60 weight percent of a $C_{8-12}$ of said vinyl aromatic monomer which is unsubstituted or substituted by a $C_{1-4}$ alkyl radical chlorine atom or mixtures thereof;
 ii) from 39.5 to 59.5 weight percent of a $C_{4-6}$ straight or branched chain of said conjugated diolefin which is unsubstituted or substituted by a chlorine atom or a mixture thereof;
 iii) from 0.5 to 10 weight percent of a $C_{3-6}$ ethylenically unsaturated carboxylic acid; and
 iv) from 0 to 5 weight percent of one or more monomers selected from the group consisting of:
  a) $C_{1-8}$ alkyl and hydroxyalkyl esters of $C_{3-6}$ ethylenically unsaturated carboxylic acid;
  b) amides of $C_{3-6}$ ethylenically unsaturated carboxylic acids, which amides are unsubstituted or substituted at the nitrogen atom by up to two radicals selected from the group consisting of $C_{1-4}$ alkyl and hydroxyalkyl radicals; and
  c) $C_{3-6}$ ethylenically unsaturated aldehydes.
2. A composition process according to claim 1 wherein said vinyl polymer is present in an amount from 30 to 40 parts by weight.
3. A composition according to claim 2, wherein said vinyl polymer is present in an amount of 35 parts by weight.
4. A composition according to claim 3 wherein said carboxylated polymer is present in an amount from 50 to 65 parts by weight.
5. A composition according to claim 4 wherein said vinyl polymer comprises:
A) 100 to 80 weight percent of vinyl chloride; and
B) up to 20 weight percent of one or more monomers selected from the group consisting of ethyl acrylate, butyl acrylate and ethylhexyl acrylate.
6. A composition according to claim 5 wherein said carboxylated as a latex comprises:
A) from 45 to 55 weight, percent of one or more monomers said vinyl aromatic selected from the group consisting of styrene, alpha methyl styrene or a mixture thereof;
B) from 54.5 to 44.5 weight percent of one or more monomers said diolefin selected from the group consisting of butadiene, isoprene and chloroprene;
C) from 0.5 to 5 weight percent of one or more monomers selected from the group consisting of acrylic acid, methacrylic acid, and itaconic acid; and
D) optionally up to 5 weight percent of one or more monomers selected from the group consisting of ethyl acrylate, propyl acrylate, butyl acrylate, ethylhexyl acrylate, and N-methylol acrylamide.
7. A composition according to claim 6 wherein said vinyl polymer comprises 75 to 80 weight percent of vinyl chloride and 20 to 25 weight percent of ethyl acrylate.
8. A composition according to claim 7 wherein said carboxylated polymer comprises:
A) 45 to 55 weight percent of styrene;
B) from 54.5 to 44.5 weight percent of butadiene; and
C) from 0.5 to 5 weight percent of acrylic acid.

* * * * *